(12) United States Patent
Geliot et al.

(10) Patent No.: US 11,511,873 B2
(45) Date of Patent: Nov. 29, 2022

(54) PROPULSION ASSEMBLY FOR AN AIRCRAFT, COMPRISING A NACELLE LOAD SUPPORT FASTENED TO A PYLON

(71) Applicant: Airbus Operations SAS, Toulouse (FR)

(72) Inventors: Jean Geliot, Toulouse (FR); Christophe Labarthe, Buzet sur Tarn (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 259 days.

(21) Appl. No.: 16/880,171

(22) Filed: May 21, 2020

(65) Prior Publication Data
US 2020/0369397 A1   Nov. 26, 2020

(30) Foreign Application Priority Data

May 24, 2019   (FR) ...................... 1905481

(51) Int. Cl.
*B64D 29/02* (2006.01)
*B64D 27/02* (2006.01)
*B64D 27/26* (2006.01)

(52) U.S. Cl.
CPC ............ *B64D 29/02* (2013.01); *B64D 27/02* (2013.01); *B64D 27/26* (2013.01)

(58) Field of Classification Search
CPC ......... B64D 27/02; B64D 27/26; B64D 29/02
USPC ......................................................... 244/55
See application file for complete search history.

(56) References Cited

U.S. PATENT DOCUMENTS

| 2009/0212155 A1* | 8/2009 | Huggins ............... B64D 27/26 244/54 |
| 2009/0266932 A1 | 10/2009 | Roche et al. |
| 2009/0283631 A1 | 11/2009 | Roche |
| 2011/0127369 A1 | 6/2011 | Dussol et al. |
| 2012/0080554 A1* | 4/2012 | Lafont ................... B64D 27/18 244/54 |
| 2012/0080555 A1 | 4/2012 | Lafont et al. |

(Continued)

FOREIGN PATENT DOCUMENTS

| EP | 2436601 A1 | 4/2012 |
| EP | 2554478 A1 | 2/2013 |

(Continued)

OTHER PUBLICATIONS

French Search Report; priority document.

*Primary Examiner* — Brady W Frazier
(74) *Attorney, Agent, or Firm* — Greer, Burns & Crain, Ltd.

(57) ABSTRACT

A propulsion assembly for an aircraft, the propulsion assembly having a pylon configured to be fastened beneath a wing of the aircraft, a turbomachine having a longitudinal direction, a median plane and a transverse plane, and a nacelle surrounding the turbomachine and having a load support disposed in the top part of the nacelle. The load support has a structural part fastened to the pylon and an aerodynamic part capping the structural part. The aerodynamic part has, at the front, a front part fastened to the structural part and, at the rear, a rear part fastened to the pylon. Separating the load support into two parts makes it possible to reduce the movements of the aerodynamic part capping the structural part of the load support.

4 Claims, 3 Drawing Sheets

(56) References Cited

U.S. PATENT DOCUMENTS

| | | | | |
|---|---|---|---|---|
| 2012/0104162 A1* | 5/2012 | West | ..................... | B64D 27/18 |
| | | | | 244/54 |
| 2013/0161446 A1 | 6/2013 | Letay et al. | | |
| 2013/0320135 A1* | 12/2013 | Raison | ................... | B64D 33/04 |
| | | | | 244/54 |

FOREIGN PATENT DOCUMENTS

| | | | |
|---|---|---|---|
| FR | 2920409 | A1 | 3/2009 |
| WO | 2008006823 | A1 | 1/2008 |
| WO | 2008006826 | A1 | 1/2008 |

* cited by examiner

PROPULSION ASSEMBLY FOR AN AIRCRAFT, COMPRISING A NACELLE LOAD SUPPORT FASTENED TO A PYLON

CROSS-REFERENCES TO RELATED APPLICATIONS

This application claims the benefit of the French patent application No. 1905481 filed on May 24, 2019, the entire disclosures of which are incorporated herein by way of reference.

FIELD OF THE INVENTION

The present invention relates to a propulsion assembly for an aircraft, the assembly comprising a pylon, a turbomachine having a fan casing and a load support having a structural part and an aerodynamic part capping the structural part. The invention also relates to an aircraft having at least one such propulsion assembly.

BACKGROUND OF THE INVENTION

An aircraft conventionally has a wing beneath which is fastened a propulsion assembly which has a pylon, a turbomachine and a nacelle. The turbomachine has an engine and a fan casing and the nacelle has a load support disposed in the top part of the nacelle, lateral cowls which are mounted so as to be articulated on the load support and outer cowls which together form an aerodynamic surface.

The load support has an aerodynamic upper surface which aligns with the lateral cowls and the other outer cowls of the nacelle. The load support is fastened to the pylon and to the fan casing by rods.

In operation, the load support follows the movements of the engine and this offsets the aerodynamic upper surface and thus deforms the aerodynamic surface of the nacelle, leading to disturbance of the flow of air around the nacelle.

It is therefore desirable to find an arrangement which makes it possible to reduce the offset of the aerodynamic upper surface of the load support relative to the other aerodynamic surfaces.

SUMMARY OF THE INVENTION

An object of the present invention is to propose an alternative propulsion assembly which makes it possible to reduce the movements of the aerodynamic surface of the load support.

To that end, a propulsion assembly for an aircraft is proposed, the propulsion assembly having:
- a pylon intended to be fastened beneath a wing of the aircraft,
- a turbomachine having a longitudinal direction X, a median plane XZ and a transverse plane YZ, and
- a nacelle surrounding the turbomachine and having a load support disposed in the top part of the nacelle, wherein the load support has a structural part fastened to the pylon and an aerodynamic part capping the structural part, and wherein the aerodynamic part has, at the front, a front part fastened to the structural part and, at the rear, a rear part fastened to the pylon.

Separating the load support into two parts makes it possible to reduce the movements of the aerodynamic part capping the structural part of the load support.

Advantageously, the pylon has a primary structure and a secondary structure, the structural part is fastened to the primary structure, and the rear part is fastened to the secondary structure.

Advantageously, the front part is fastened to the structural part by means of a first front rod, a second front rod and a third front rod, wherein:
- the first front rod is a rod which has two fastening ends, with a first end mounted so as to be articulated on the structural part and a second end mounted so as to be articulated on the front part, and wherein the line between the two ends is in the median plane XZ,
- the second front rod is a rod which has two fastening ends, with a first end mounted so as to be articulated on the structural part and a second end mounted so as to be articulated on the front part, and wherein the line between the two ends is in a plane parallel to the transverse plane YZ, and
- the third front rod is a rod which has three fastening ends, with a first end mounted so as to be articulated on the structural part and a second and a third end mounted so as to be articulated on the front part, and wherein the three ends are in a plane parallel to the transverse plane YZ.

Advantageously, the rear part is fastened to the secondary structure by means of a first rear rod and a second rear rod, wherein
- the first rear rod is a rod which has two fastening ends, with a first end mounted so as to be articulated on the secondary structure and a second end mounted so as to be articulated on the rear part, and wherein the line between the two ends is in a plane parallel to the transverse plane YZ, and
- the second rear rod is a rod which has three fastening ends, with a first end mounted so as to be articulated on the secondary structure and a second and a third end mounted so as to be articulated on the rear part, and wherein the three ends are in a plane parallel to the transverse plane YZ.

The invention also proposes an aircraft having at least one propulsion assembly according to one of the preceding variants.

BRIEF DESCRIPTION OF THE DRAWINGS

The above-mentioned features of the invention, along with others, will become more clearly apparent on reading the following description of one exemplary embodiment, the description being given with reference to the appended drawings, in which.

DETAILED DESCRIPTION OF THE PREFERRED EMBODIMENTS

Throughout the following description, by convention, the longitudinal direction X is parallel to the longitudinal axis of the turbomachine and oriented toward the front of the aircraft. Moreover, the transverse direction Y corresponds to the direction oriented transversely relative to the turbomachine, and the vertical direction Z corresponds to the vertical direction or height, these three directions being mutually orthogonal. The turbomachine has a median plane XZ and a transverse plane YZ.

Moreover, the terms "front" and "rear" are to be considered relative to a direction of forward movement of the aircraft when the turbomachine is in operation, this direction being schematically shown by the arrow F.

Figure 1:
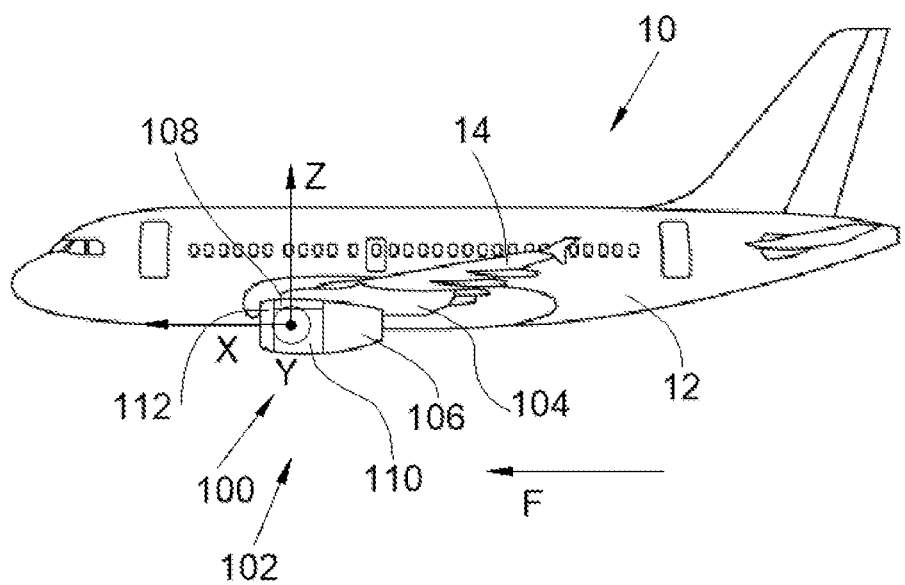
FIG. 1 is a side view of an aircraft having a propulsion assembly according to the invention.

FIG. 1 shows an aircraft 10 which has a fuselage 12 to which are attached two wings 14, on either side of the fuselage 12. Beneath each wing 14 is fastened at least one propulsion assembly 100 which has a pylon 104 fastened beneath the wing 14 and a turbomachine 102, in this case a two-flow turbomachine, having an engine 202 (FIG. 2) and a fan surrounded by a fan casing 204 and disposed upstream of the engine 202 and driven by the engine 202.

The propulsion assembly 100 also has a cylindrical nacelle 106 which surrounds the turbomachine 102, in particular the engine 202 and the fan casing 204.

Figure 2:
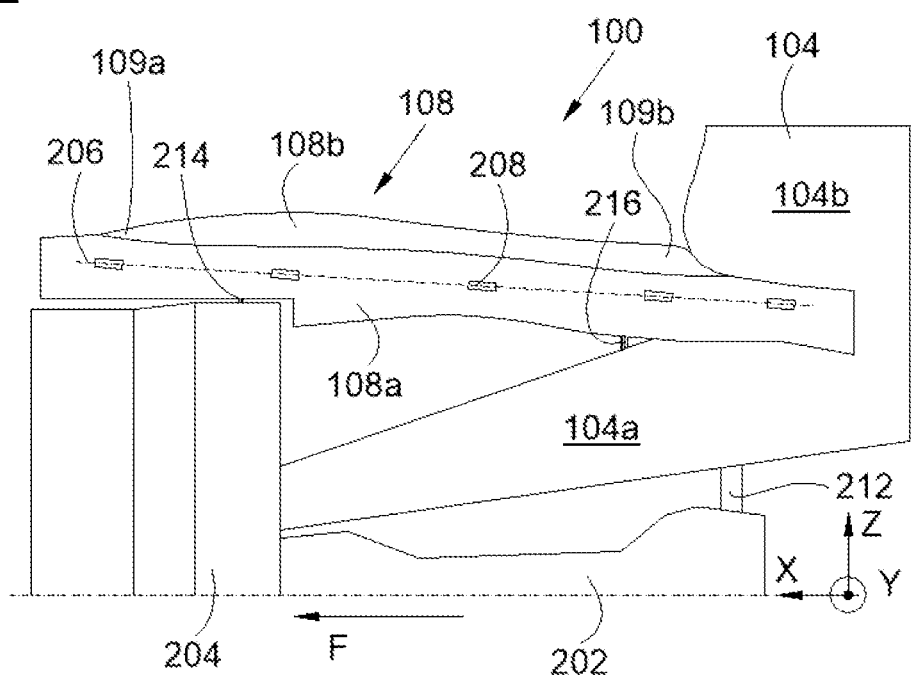
FIG. 2 is a side view of the propulsion assembly according to the invention.

FIG. 2 shows the propulsion assembly 100.

The nacelle 106 has a load support 108 which is disposed in the top part of the nacelle 106, lateral cowls 110 and outer cowls.

The load support 108 has a structural part 108a fastened to the pylon 104 and an aerodynamic part 108b capping the structural part 108a. The aerodynamic part 108b forms an aerodynamic upper surface which aligns with the lateral cowls 110 and the other outer cowls of the nacelle 106 so that together they form an aerodynamic surface.

The lateral cowls 110 are mounted so as to be articulated on either side of the structural part 108a about a hinge line 206. Each lateral cowl 110 is mounted so as to be articulated on a plurality of hinges 208 fastened to the structural part 108a.

As regards the other outer cowls, the nacelle 106 in this case has a nose cowl 112 which is fastened to the front of the load support 108 and is extended as far as an air intake through which the air supplying the turbomachine 102 enters.

The pylon 104 is fastened to the structure of the wing 14 and bears the engine 202 to which it is fastened by a rear engine attachment 212 fastened between a rear part of the pylon 104 and a rear part of the engine 202 and a front engine attachment fastened between a front part of the pylon 104 and a front part of the engine 202, in particular at the hub of the engine 202. In the embodiment of the invention presented in FIG. 2, the front engine attachment is hidden by the fan casing 204.

The front engine attachment and the rear engine attachment 212 will not be described in more detail since they can take any of the forms known to a person skilled in the art.

The propulsion assembly 100 also has front fan attachments 214 fastened between the fan casing 204 and the structural part 108a and a rear pylon attachment 216 fastened between the pylon 104 and the structural part 108a.

Figure 3:
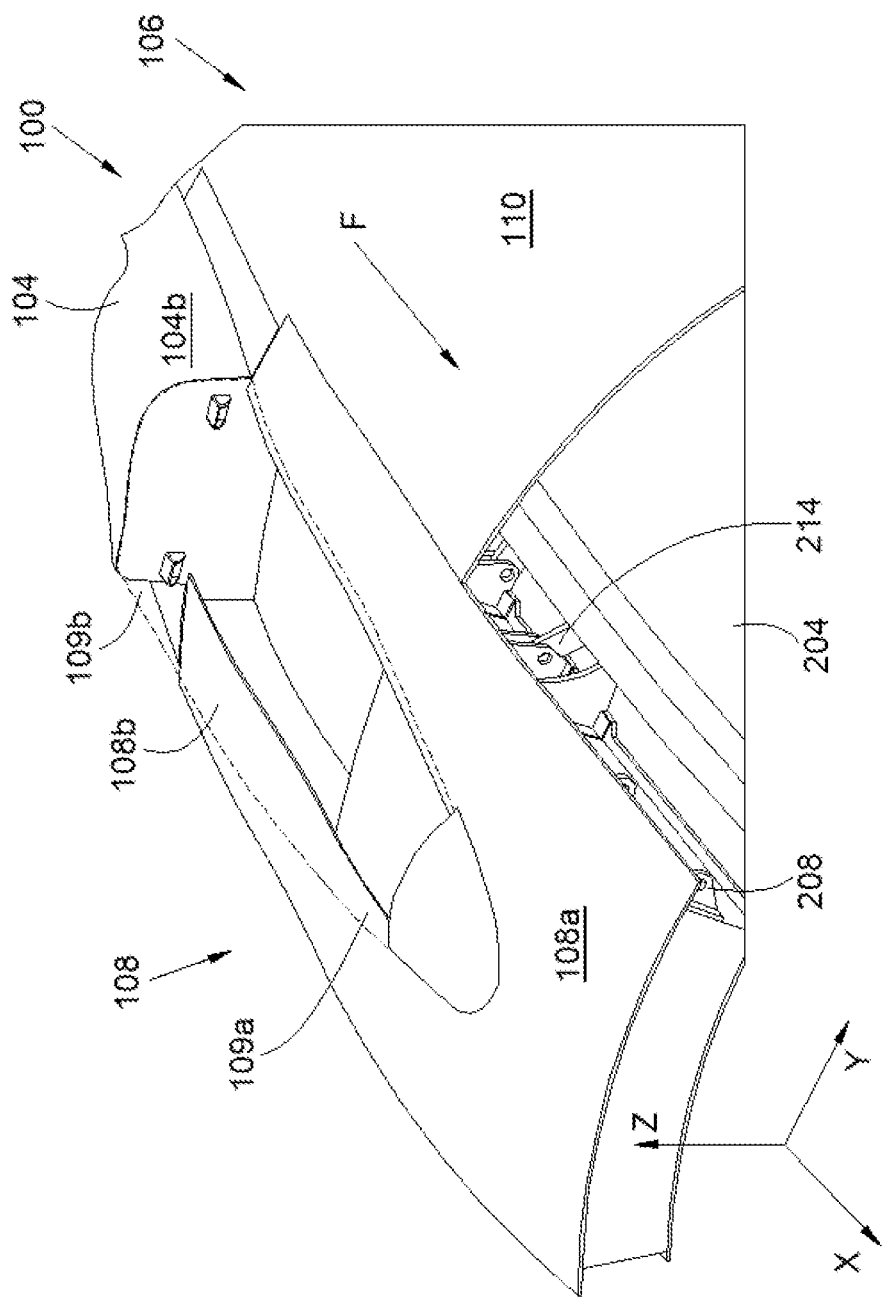
FIG. 3 is a perspective view of a load support according to the invention.

The front fan attachments 214 (one on the port side and one on the starboard side as indicated in FIG. 3) are located in the top part of the fan casing 204 and the fan casing 204 is below the structural part 108a.

FIG. 3 shows the load support 108 with the structural part 108a and the aerodynamic part 108b which is shown as transparent (dash-dotted line) and which has, at the front, a front part 109a and, at the rear, a rear part 109b.

Figure 4:
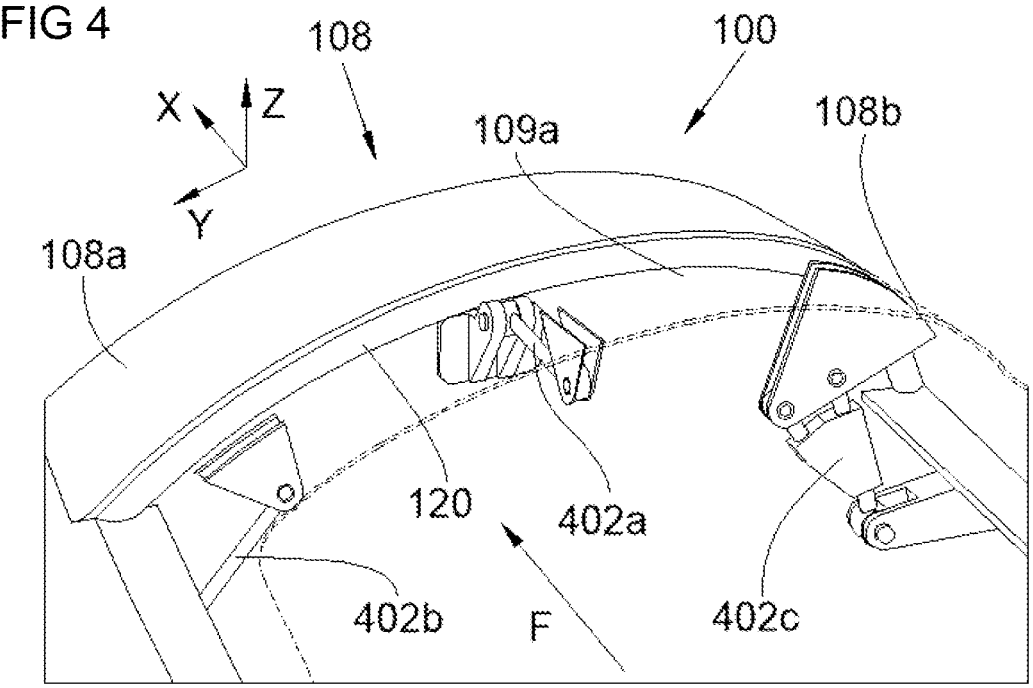
FIG. 4 is a perspective view of a fastening of a front part of an aerodynamic part of the load support.
Figure 5:
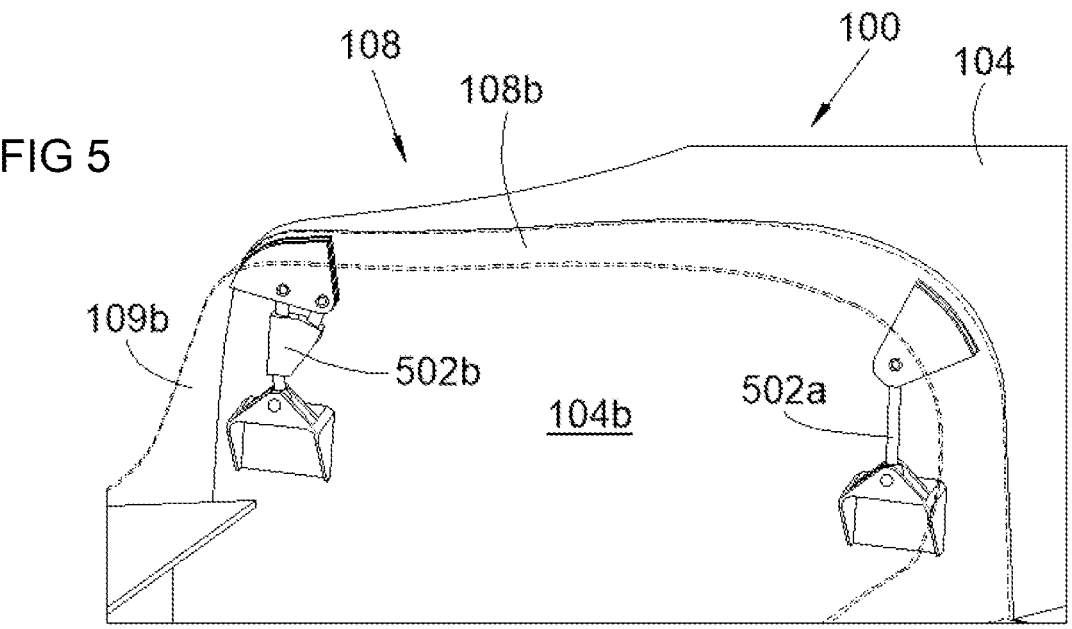
FIG. 5 is a perspective view of a fastening of a rear part of the aerodynamic part.

FIG. 4 shows the fastening of the front part 109a, which is fastened to the structural part 108a, and FIG. 5 shows the fastening of the rear part 109b, which is fastened to the pylon 104. In FIGS. 4 and 5, the aerodynamic part 108b is partially cut away and shown as transparent.

Separating the load support 108 into two parts in this way and the particular fastening of the aerodynamic part 108b to the structural part 108a and to the pylon 104 make it possible to disassociate the movements of the engine 202 and of the aerodynamic part 108b, which moves less than in the case of the prior art, from one another.

The front fan attachments 214 and the rear pylon attachment 216 can take different forms and are, for example, made from rods mounted so as to be articulated at each of their ends as in the case of the prior art.

The pylon 104 has a primary structure 104a and a secondary structure 104b.

The primary structure 104a extends beneath the structural part 108a and is fastened to the wing 14. The primary structure 104a reacts the forces of the engine 202 through the front and rear engine attachments 212 and the structural part 108a is fastened to the primary structure 104a through the rear pylon attachment 216.

The secondary structure 104b extends around the primary structure 104a and forms, in particular, the aerodynamic surface of the pylon 104 and the rear part 109b is fastened to the secondary structure 104b by means of rods as described below with reference to FIG. 5.

At the rear, the aerodynamic part 108b is fastened only to the pylon 104 by means of rods (FIG. 5) and, at the front, the aerodynamic part 108b is fastened only to the structural part 108a by means of rods as described below with reference to FIG. 4.

FIG. 4 shows the fastening of the front part 109a to the structural part 108a by means of a first front rod 402a, a second front rod 402b and a third front rod 402c.

The first front rod 402a is a rod which has two fastening ends, with a first end mounted so as to be articulated on the structural part 108a and a second end mounted so as to be articulated on the front part 109a, and wherein the line between the two ends is in the median plane XZ and generally parallel to the longitudinal direction X. The first front rod 402a makes it possible to react the forces in the X direction.

For each end of the first front rod 402a, the fastening of the end takes the form of a clevis wherein the pin of the clevis is parallel to the transverse direction Y and wherein, in the embodiment of the invention shown in FIG. 4, each clevis is secured to the structural part 108a or to the front part 109a.

The second front rod 402b is a rod which has two fastening ends, with a first end mounted so as to be articulated on the structural part 108a and a second end mounted so as to be articulated on the front part 109a, and wherein the line between the two ends is in a plane parallel to the transverse plane YZ. The second front rod 402b makes it possible to react the forces in the Z direction.

For each end of the second front rod 402b, the fastening of the end takes the form of a clevis wherein the pin of the clevis is parallel to the longitudinal direction X and wherein, in the embodiment of the invention shown in FIG. 4, each clevis is secured to the structural part 108a or to the front part 109a.

The third front rod 402c is a rod which has three fastening ends, with a first end mounted so as to be articulated on the structural part 108a and a second and a third end mounted so as to be articulated on the front part 109a, and wherein the three ends are in a plane parallel to the transverse plane YZ. The third front rod 402c makes it possible to react the forces in the Z and Y directions.

For each end of the third front rod 402c, the fastening of the end takes the form of a clevis wherein the pin of the clevis is parallel to the longitudinal direction X and wherein, in the embodiment of the invention shown in FIG. 4, each clevis is secured to the structural part 108a or to the front part 109a.

FIG. 5 shows the fastening of the rear part 109b to the secondary structure 104b by means of a first rear rod 502a and a second rear rod 502b.

The first rear rod 502a is a rod which has two fastening ends, with a first end mounted so as to be articulated on the secondary structure 104b and a second end mounted so as to be articulated on the rear part 109b, and wherein the line between the two ends is in a plane parallel to the transverse plane YZ and generally parallel to the vertical direction Z. The first rear rod 502a makes it possible to react the forces in the Z direction.

For each end of the first rear rod 502a, the fastening of the end takes the form of a clevis wherein the pin of the clevis is parallel to the longitudinal direction X and wherein, in the embodiment of the invention shown in FIG. 5, each clevis is secured to the secondary structure 104b or to the rear part 109b.

The second rear rod 502b is a rod which has three fastening ends, with a first end mounted so as to be articulated on the secondary structure 104b and a second and a third end mounted so as to be articulated on the rear part 109b, and wherein the three ends are in a plane parallel to the transverse plane YZ. The second rear rod 502b makes it possible to react the forces in the Z and Y directions.

For each end of the second rear rod 502b, the fastening of the end takes the form of a clevis wherein the pin of the clevis is parallel to the longitudinal direction X and wherein, in the embodiment of the invention shown in FIG. 5, each clevis is secured to the secondary structure 104b or to the rear part 109b.

In order to establish a good seal around the aerodynamic part 108b, a seal 120, for example made of elastomer, is affixed around the aerodynamic part 108b and is fastened either to the aerodynamic part 108b or to the structural part 108a or the pylon 104.

At the rear part, the seal can take the form of metal fingers which make it possible to absorb the movements of the aerodynamic part 108b and to retain good aerodynamic properties.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, said propulsion assembly having:

a pylon configured to be fastened beneath a wing of the aircraft, a turbomachine having a longitudinal direction, a median plane and a transverse plane, and a nacelle surrounding the turbomachine and having a load support disposed in a top part of the nacelle, wherein said load support has a structural part fastened to the pylon and an aerodynamic part capping the structural part, wherein the aerodynamic part has, at a front, a front part fastened to the structural part and, at a rear, a rear part fastened to the pylon, wherein the pylon has a primary structure and a secondary structure, wherein the structural part is fastened to the primary structure, wherein the rear part is fastened to the secondary structure, wherein the front part is fastened to the structural part by means of a first front rod, a second front rod and a third front rod, wherein:

the first front rod is a rod which has two fastening ends, with a first end mounted to be articulated on the structural part and a second end mounted to be articulated on the front part, and wherein a line between the two ends is in the median plane, the second front rod is a rod which has two fastening ends, with a first end mounted to be articulated on the structural part and a second end mounted to be articulated on the front part, and wherein a line between the two ends is in a plane parallel to the transverse plane, and the third front rod is a rod which has three fastening ends, with a first end mounted to be articulated on the structural part and a second and a third end mounted to be articulated on the front part, and wherein the three ends are in a plane parallel to the transverse plane.

2. A propulsion assembly for an aircraft, said propulsion assembly having:

a pylon configured to be fastened beneath a wing of the aircraft, a turbomachine having a longitudinal direction, a median plane and a transverse plane, and a nacelle surrounding the turbomachine and having a load support disposed in a top part of the nacelle, wherein said load support has a structural part fastened to the pylon and an aerodynamic part capping the structural part, wherein the aerodynamic part has, at a front, a front part fastened to the structural part and, at a rear, a rear part fastened to the pylon, wherein the pylon has a primary structure and a secondary structure, wherein the structural part is fastened to the primary structure, and wherein the rear part is fastened to the secondary structure, wherein the rear part is fastened to the secondary structure by means of a first rear rod and a second rear rod, wherein the first rear rod is a rod which has two fastening ends, with a first end mounted to be articulated on the secondary structure and a second end mounted to be articulated on the rear part, and wherein a line between the two ends is in a plane parallel to the transverse plane, and wherein the second rear rod is a rod which has three fastening ends, with a first end mounted to be articulated on the secondary structure and a second and a third end mounted to be articulated on the rear part, and wherein the three ends are in a plane parallel to the transverse plane.

3. An aircraft having at least one propulsion assembly according to claim 1.

4. An aircraft having at least one propulsion assembly according to claim 2.

* * * * *